United States Patent
Dolan et al.

(10) Patent No.: US 12,430,175 B2
(45) Date of Patent: Sep. 30, 2025

(54) SYSTEMS AND METHODS FOR ELECTRONICALLY AUGMENTING RESOURCE DISTRIBUTION COMMANDS AND FACILITATING TRANSFER OF RESOURCES

(71) Applicant: BANK OF AMERICA CORPORATION, Charlotte, NC (US)

(72) Inventors: Heather Roseann Dolan, Sarasota, FL (US); Kathleen Hanko Trombley, Oakboro, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 811 days.

(21) Appl. No.: 17/672,795

(22) Filed: Feb. 16, 2022

(65) Prior Publication Data
US 2023/0259397 A1     Aug. 17, 2023

(51) Int. Cl.
*G06F 9/50*     (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | |
|---|---|---|
| 8,160,960 B1 | 4/2012 | Fei et al. |
| 9,917,802 B2 | 3/2018 | Melzer et al. |
| 10,084,738 B2 | 9/2018 | Venkatakrishnan et al. |
| 10,515,345 B2 | 12/2019 | Koh et al. |
| 11,004,038 B2 | 5/2021 | Kassemi et al. |
| 11,295,282 B2 | 4/2022 | Venkatakrishnan et al. |
| 11,423,430 B2 | 8/2022 | Griffin |
| 2005/0143108 A1 | 6/2005 | Seo et al. |
| 2014/0025766 A1 | 1/2014 | Beck et al. |
| 2014/0089195 A1 | 3/2014 | Ward et al. |
| 2014/0136407 A1* | 5/2014 | Hazam ................. G06Q 20/108 705/42 |
| 2014/0351713 A1 | 11/2014 | Sjstedt et al. |
| 2015/0019655 A1 | 1/2015 | Kizhakkiniyil et al. |
| 2015/0081349 A1 | 3/2015 | Johndrow et al. |
| 2015/0099490 A1 | 4/2015 | Whitten et al. |

(Continued)

*Primary Examiner* — Eric C Wai
(74) *Attorney, Agent, or Firm* — Moore & Van Allen PLLC; R.W. McCord Rayburn

(57) ABSTRACT

Systems, computer program products, and methods are described herein for electronically augmenting resource distribution commands and facilitating transfer of resources. The present invention may be configured to display, via a user device and to a user, a graphical user interface including input fields for providing commands to perform a resource distribution and receive, from the user and via the graphical user interface displayed via the user device, a single user input at the graphical user interface. The present invention may be configured to, in response to receiving the single user input, automatically identify, based on historical resource distribution data associated with the user, inputs corresponding to each of the input fields and display, via the graphical user interface displayed via the user device and in each input field of the input fields, an input, of the inputs, corresponding to the input field to complete the commands.

20 Claims, 2 Drawing Sheets

(56) References Cited

U.S. PATENT DOCUMENTS

| | | |
|---|---|---|
| 2015/0142457 A1* | 5/2015 | Marshall ................ G16H 50/50 |
| | | 705/2 |
| 2015/0264022 A1 | 9/2015 | Manvi et al. |
| 2015/0278813 A1 | 10/2015 | Yue et al. |
| 2016/0055533 A1 | 2/2016 | Tanio et al. |
| 2017/0011383 A1 | 1/2017 | Melzer |
| 2017/0118189 A1 | 4/2017 | Venkatakrishnan et al. |
| 2020/0005258 A1* | 1/2020 | Miller ................... G06F 40/174 |
| 2020/0210990 A1 | 7/2020 | Laracey et al. |
| 2021/0006609 A1 | 1/2021 | Rosanuru et al. |

* cited by examiner

SYSTEMS AND METHODS FOR ELECTRONICALLY AUGMENTING RESOURCE DISTRIBUTION COMMANDS AND FACILITATING TRANSFER OF RESOURCES

FIELD OF THE INVENTION

The present invention embraces systems and methods for electronically augmenting resource distribution commands and facilitating transfer of resources.

BACKGROUND

An electronic system may be configured to receive and process information input by a user to a plurality of input fields for providing commands for performing resource distributions. The electronic system may be configured to transfer resources via transmission networks between systems and/or devices based on the information input by the user.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for electronically augmenting resource distribution commands and facilitating transfer of resources. The system may include at least one non-transitory storage device and at least one processing device coupled to the at least one non-transitory storage device, where the at least one processing device may be configured to display, via a user device and to a user, a graphical user interface including input fields for providing commands to perform a resource distribution, where the commands include an amount of resources to be distributed from a source retainer associated with the user to another source retainer when performing the resource distribution. The at least one processing device may be configured to receive, from the user and via the graphical user interface displayed via the user device, a single user input at the graphical user interface, in response to receiving the single user input, automatically identify, based on historical resource distribution data associated with the user, inputs corresponding to each of the input fields and, in response to receiving the single user input, display, via the graphical user interface displayed via the user device and in each input field of the input fields, an input, of the inputs, corresponding to the input field to complete the commands. The at least one processing device may be configured to receive, from the user and via the graphical user interface displayed via the user device, a confirmation input confirming the completed commands and, in response to receiving the confirmation input, perform the resource distribution by distributing the amount of the resources from the source retainer associated with the user to the other source retainer.

In some embodiments, the at least one processing device may be configured to, when automatically identifying the inputs corresponding to each of the input fields, provide the single user input to a machine learning model trained using the historical resource distribution data associated with the user to determine the inputs corresponding to each of the input fields.

In some embodiments, the at least one processing device may be configured to, before displaying the graphical user interface, prompt, via the user device, the user to provide authentication credentials, receive, via the user device, the authentication credentials, determine, using the authentication credentials, whether the user has authority to provide commands to perform resource distributions from the source retainer, and, when displaying the graphical user interface, only display the graphical user interface after determining that the user has the authority to provide commands to perform resource distributions from the source retainer.

In some embodiments, the single user input may include an image input to an input field of the graphical user interface. Additionally, or alternatively, the input field may be a text field, and the image may include an image, symbol, and/or icon used in electronic communication to express an emotional attitude, convey information succinctly, and/or communicate a message without using words.

In some embodiments, the input fields may include an amount field for the amount of resources to be distributed, a source retainer field for the source retainer, a recipient field for a recipient of the resource distribution, and/or the like.

In some embodiments, the input fields may include an order field for identifying goods and/or services, and the at least one processing device may be configured to, when automatically identifying the inputs corresponding to each of the input fields, automatically identify information identifying goods and/or services previously ordered by the user during a historical interaction associated with the single user input and, when displaying, via the graphical user interface and in each input field of the input fields, the input, of the inputs, corresponding to the input field to complete the commands, display, in the order field, the information identifying the goods and/or services previously ordered by the user during the historical interaction associated with the single user input.

In some embodiments, the input fields may include a recipient field for a recipient of the resource distribution, and the at least one processing device may be configured to, when automatically identifying inputs corresponding to each of the input fields, automatically identify, based on the historical resource distribution data associated with the user, recipients of previous resource distributions associated with the single user input, determine, based on the historical resource distribution data associated with the user and for each recipient of the recipients, likelihoods of the user selecting the recipients for the resource distribution, and, when displaying, via the graphical user interface and in each input field of the input fields, the input, of the inputs, corresponding to the input field to complete the commands, display, in the recipient field, a drop-down menu listing the recipients in an order based on the likelihoods of the user selecting the recipients for the resource distribution. Additionally, or alternatively, the at least one processing device may be configured to, when determining the likelihoods of the user selecting the recipients for the resource distribution, provide the single user input to a machine learning model trained using the historical resource distribution data associated with the user to determine the likelihoods of the user selecting the recipients for the resource distribution.

In some embodiments, the at least one processing device may be configured to, before displaying the graphical user interface and during another interaction with the user, display, via the user device and to the user, the graphical user interface including the input fields, receive, from the user and via the graphical user interface displayed via the user device, the inputs corresponding to each of the input fields, and, after receiving the inputs, receive, from the user and via the graphical user interface displayed via the user device, an input command to associate the inputs with the single user input. Additionally, or alternatively, the single user input may include an image input to an input field of the graphical user interface. In some embodiments, the input field may be a text field, and the image may include an image, symbol, and/or icon used in electronic communication to express an emotional attitude, convey information succinctly, and/or communicate a message without using words. Additionally, or alternatively, the single user input may include a selection of a link in the graphical user interface.

In another aspect, the present invention embraces a computer program product for electronically augmenting resource distribution commands and facilitating transfer of resources. The computer program product may include a non-transitory computer-readable medium including code causing a first apparatus to display, via a user device and to a user, a graphical user interface including input fields for providing commands to perform a resource distribution, where the commands include an amount of resources to be distributed from a source retainer associated with the user to another source retainer when performing the resource distribution. The non-transitory computer-readable medium may include code causing the first apparatus to receive, from the user and via the graphical user interface displayed via the user device, a single user input at the graphical user interface, in response to receiving the single user input, automatically identify, based on historical resource distribution data associated with the user, inputs corresponding to each of the input fields and, in response to receiving the single user input, display, via the graphical user interface displayed via the user device and in each input field of the input fields, an input, of the inputs, corresponding to the input field to complete the commands. The non-transitory computer-readable medium may include code causing the first apparatus to receive, from the user and via the graphical user interface displayed via the user device, a confirmation input confirming the completed commands and, in response to receiving the confirmation input, perform the resource distribution by distributing the amount of the resources from the source retainer associated with the user to the other source retainer.

In some embodiments, the non-transitory computer-readable medium may include code causing the first apparatus to, when automatically identifying the inputs corresponding to each of the input fields, provide the single user input to a machine learning model trained using the historical resource distribution data associated with the user to determine the inputs corresponding to each of the input fields.

In some embodiments, the non-transitory computer-readable medium may include code causing the first apparatus to, before displaying the graphical user interface, prompt, via the user device, the user to provide authentication credentials, receive, via the user device, the authentication credentials, determine, using the authentication credentials, whether the user has authority to provide commands to perform resource distributions from the source retainer, and, when displaying the graphical user interface, only display the graphical user interface after determining that the user has the authority to provide commands to perform resource distributions from the source retainer.

In some embodiments, the single user input may include an image input to an input field of the graphical user interface. Additionally, or alternatively, the input field may be a text field, and the image may include an image, symbol, and/or icon used in electronic communication to express an emotional attitude, convey information succinctly, and/or communicate a message without using words.

In some embodiments, the input fields may include an amount field for the amount of resources to be distributed, a source retainer field for the source retainer, a recipient field for a recipient of the resource distribution, and/or the like.

In yet another aspect, a method for electronically augmenting resource distribution commands and facilitating transfer of resources is presented. The method may include displaying, via a user device and to a user, a graphical user interface including input fields for providing commands to perform a resource distribution, where the commands include an amount of resources to be distributed from a source retainer associated with the user to another source retainer when performing the resource distribution. The method may include receiving, from the user and via the graphical user interface displayed via the user device, a single user input at the graphical user interface, in response to receiving the single user input, automatically identifying, based on historical resource distribution data associated with the user, inputs corresponding to each of the input fields and, in response to receiving the single user input, displaying, via the graphical user interface displayed via the user device and in each input field of the input fields, an input, of the inputs, corresponding to the input field to complete the commands. The method may include receiving, from the user and via the graphical user interface displayed via the user device, a confirmation input confirming the completed commands and, in response to receiving the confirmation input, performing the resource distribution by distributing the amount of the resources from the source retainer associated with the user to the other source retainer.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
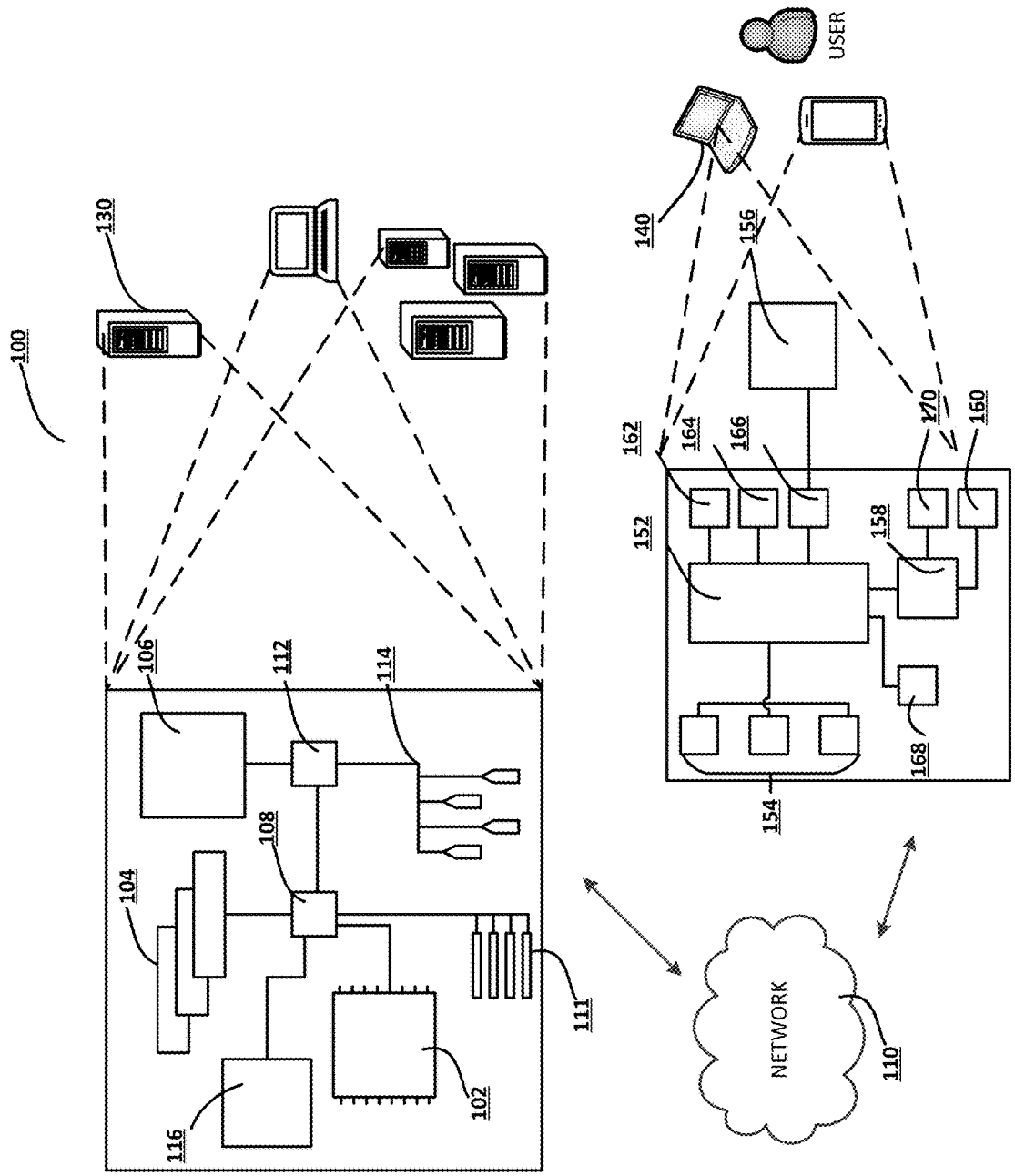
Figure 2:
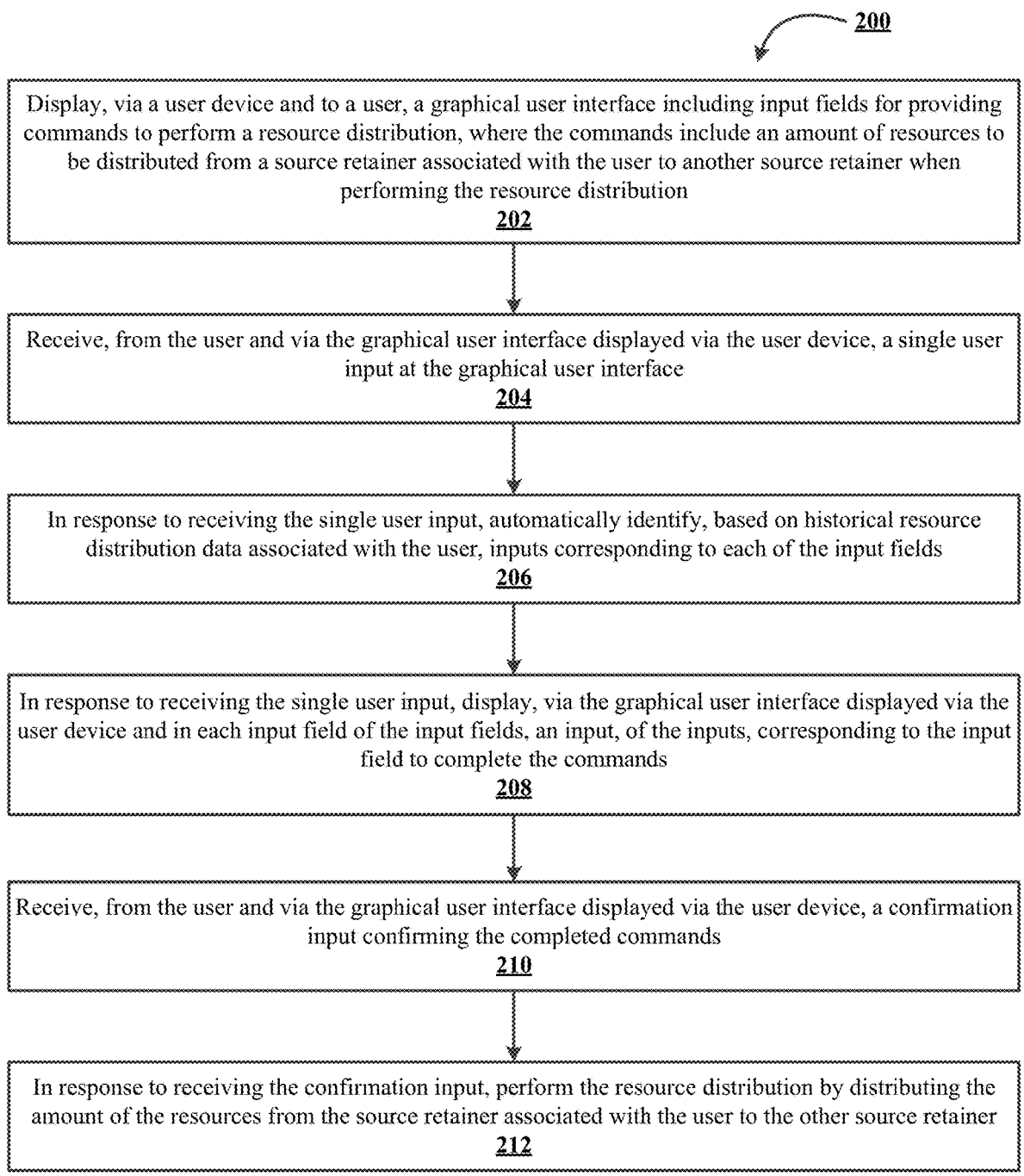

Having thus described embodiments of the invention in general terms, reference will now be made the accompanying drawings, wherein:

FIG. 1 illustrates technical components of a system for electronically augmenting resource distribution commands and facilitating transfer of resources, in accordance with an embodiment of the invention; and FIG. 2 illustrates a process flow for electronically augmenting resource distribution commands and facilitating transfer of resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, electronic system may be configured to receive and process information input by a user to a plurality of input fields for providing commands for performing resource distributions. The electronic system may be configured to transfer resources via transmission networks between systems and/or devices based on the information input by the user. However, users regularly make errors when completing the input fields for providing commands, which results in the electronic system processing the erroneous information and erroneously transferring resources via the transmission networks. Processing such erroneous information unnecessarily consumes significant computing resources, network resources, and financial resources, and erroneously transferring resources consumes additional computing resources, network resources, and financial resources. Furthermore, when erroneous transfers occur, users must communicate with an entity operating the electronic system and request that the erroneous transfers be reversed, which also unnecessarily consumes significant computing resources, network resources, and financial resources. Finally, the process of reversing the erroneous transfers further consumes significant computing resources, network resources, and financial resources.

Some embodiments described herein provide a system, a computer program product, and/or a method for electronically augmenting resource distribution commands and facilitating transfer of resources. For example, a system (e.g., an electronic system for electronically augmenting resource distribution commands and facilitating transfer of resources and/or the like) may be configured to display, via a user device and to a user, a graphical user interface including input fields for providing commands to perform a resource distribution and receive a single user input at the graphical user interface. The system may be configured to, in response to receiving the single user input, automatically identify, based on historical resource distribution data associated with the user, inputs corresponding to each of the input fields and display, via the graphical user interface, the identified inputs in the input fields to complete the commands for performing a resource distribution. By automatically identifying and populating the input fields, the system prevents the user from providing erroneous information, which prevents the system from processing erroneous information and erroneously transferring resources via the transmission networks. Accordingly, the system conserves computing resources, network resources, and financial resources that would otherwise be consumed by processing erroneous information, erroneously transferring resources, users communicating with the entity to request that the erroneous transfers be reversed, and reversing the erroneous transfers. In some embodiments, the system may be configured to receive, from the user and via the graphical user interface displayed via the user device, a confirmation input confirming the completed commands and, in response to receiving the confirmation input, perform the resource distribution by distributing the amount of the resources from the source retainer associated with the user to the other source retainer.

In some embodiments, the system may prompt the user to provide authentication credentials before displaying the graphical user interface and determine whether the user has authority to provide commands to perform resource distributions. Additionally, or alternatively, the system may provide the single user input to a machine learning model trained using the historical resource distribution data associated with the user to determine the inputs corresponding to each of the input fields.

In some embodiments, the single user input may include an image input to one of the input fields of the graphical user interface. For example, the input field may be a text field, and the single user input may include an image, symbol, and/or icon used in electronic communication to express an emotional attitude, convey information succinctly, and/or communicate a message without using words (e.g., an emoji and/or the like).

In some embodiments, the input fields may include an order field for identifying goods and/or services that the user is ordering, and the system may, in response to receiving the single user input, automatically identify and display information identifying goods and/or services that the user previously ordered during a historical interaction associated with the single user input.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for electronically augmenting resource distribution commands and facilitating transfer of resources within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for electronically augmenting resource distribution commands and facilitating transfer of resources, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more resource distribution command management systems, resource distribution systems, and/or the like (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more resource distribution command management systems, resource distribution systems, and/or the like may perform one or more of the steps described herein with respect to the process flows described herein with respect to FIG. 2.

FIG. 2 illustrates a process flow 200 for electronically augmenting resource distribution commands and facilitating transfer of resources, in accordance with an embodiment of the invention. In some embodiments, one or more resource distribution command management systems, resource distribution systems, and/or the like (e.g., similar to one or more of the systems described herein with respect to FIG. 1) may perform one or more of the steps of process flow 200.

A shown in block 202, the process flow 200 may include displaying, via a user device and to a user, a graphical user interface including input fields for providing commands to perform a resource distribution, where the commands include an amount of resources to be distributed from a source retainer associated with the user to another source retainer when performing the resource distribution. For example, the graphical user interface may include an input field for a source retainer from which resources are to be transferred, an input field for an amount of resources to be transferred/distributed, an input field for a source retainer and/or recipient to which resources are to be transferred, an input field for a message to be sent with the resources, and/or the like.

As shown in block 204, the process flow 200 may include receiving, from the user and via the graphical user interface displayed via the user device, a single user input at the graphical user interface. For example, the single user input may be the user inserting an emoji in a text field, the user selecting a pre-configured transfer command (e.g., previously established by the user with the system, generated by the system based on historical resource distribution data associated with the user, and/or the like), and/or the like. In some embodiments, the single user input may be the user inserting only one character, one word, one emoji, and/or the like into an input field (e.g., a text field), selecting one option, one emoji, one button, and/or the like for an input field (e.g., a drop-down menu, a button, a radio button, a menu selection, and/or the like), and/or the like.

As shown in block 206, the process flow 200 may include, in response to receiving the single user input, automatically identifying, based on historical resource distribution data associated with the user, inputs corresponding to each of the input fields. For example, the system may automatically identify other inputs to the other input fields that were used concurrently with the single user input in historical commands to perform resource distributions.

As shown in block 208, the process flow 200 may include, in response to receiving the single user input, displaying, via the graphical user interface displayed via the user device and in each input field of the input fields, an input, of the inputs, corresponding to the input field to complete the commands. For example, the system may display the graphical user interface with the other inputs identified as being used concurrently with the single user input in historical commands in the other input fields of the graphical user interface. In other words, the system may identify other inputs to complete the command based on historical resource distribution data and the single user input and then auto-populate the other inputs in the other input fields of the graphical user interface.

As shown in block 210, the process flow 200 may include receiving, from the user and via the graphical user interface displayed via the user device, a confirmation input confirming the completed commands. For example, the user may select a button (e.g., a confirm button, a submit button, a transfer button, and/or the like) to confirm the commands for performing the resource distribution.

As shown in block 212, the process flow 200 may include, in response to receiving the confirmation input, performing the resource distribution by distributing the amount of the resources from the source retainer associated with the user to the other source retainer. For example, the system may, in response to confirmation from the user, transfer resources from the source retainer associated with the user to the other source retainer in accordance with the provided commands. Additionally, or alternatively, the process flow 200 may include automatically performing the resource distribution by distributing the amount of the resources from the source retainer associated with the user to the other source retainer in response to receiving the single user input. For example, the single user input may be the user selecting a pre-configured transfer command (e.g., previously established by the user with the system, generated by the system based on historical resource distribution data associated with the user, and/or the like), and the system may automatically identify other inputs for completing the command, auto-populate the other input fields with the other inputs, and automatically transfer resources from the source retainer associated with the user to the other source retainer in response to the user selecting the pre-configured transfer command.

Process flow 200 may include additional embodiments, such as any single embodiment or any combination of embodiments described below and/or in connection with one or more other processes described elsewhere herein.

In a first embodiment, the process flow 200 may include, when automatically identifying the inputs corresponding to each of the input fields, providing the single user input to a machine learning model trained using the historical resource distribution data associated with the user to determine the inputs corresponding to each of the input fields.

In a second embodiment alone or in combination with the first embodiment, the process flow 200 may include, before displaying the graphical user interface, prompting, via the user device, the user to provide authentication credentials, receiving, via the user device, the authentication credentials, determining, using the authentication credentials, whether the user has authority to provide commands to perform resource distributions from the source retainer, and/or, when displaying the graphical user interface, only displaying the graphical user interface after determining that the user has the authority to provide commands to perform resource distributions from the source retainer.

In a third embodiment alone or in combination with any of the first through second embodiments, the single user input may include an image input to an input field of the graphical user interface.

In a fourth embodiment alone or in combination with any of the first through third embodiments, the input field may be a text field, and the image may include an image, symbol, and/or icon used in electronic communication to express an emotional attitude, convey information succinctly, and/or communicate a message without using words.

In a fifth embodiment alone or in combination with any of the first through fourth embodiments, the input fields may include an amount field for the amount of resources to be distributed, a source retainer field for the source retainer, a recipient field for a recipient of the resource distribution, and/or the like In a sixth embodiment alone or in combination with any of the first through fifth embodiments, the input fields may include an order field for identifying at least one of goods or services, and the process flow 200 may include, when automatically identifying the inputs corresponding to each of the input fields, automatically identifying information identifying at least one of goods or services previously ordered by the user during a historical interaction associated with the single user input and, when displaying, via the graphical user interface and in each input field of the input fields, the input, of the inputs, corresponding to the input field to complete the commands, displaying, in the order field, the information identifying the at least one of goods or services previously ordered by the user during the historical interaction associated with the single user input.

In a seventh embodiment alone or in combination with any of the first through sixth embodiments, the input fields may include a recipient field for a recipient of the resource distribution, and the process flow 200 may include, when automatically identifying inputs corresponding to each of the input fields, automatically identifying, based on the historical resource distribution data associated with the user, recipients of previous resource distributions associated with the single user input, determining, based on the historical resource distribution data associated with the user and for each recipient of the recipients, likelihoods of the user selecting the recipients for the resource distribution, and/or, when displaying, via the graphical user interface and in each input field of the input fields, the input, of the inputs, corresponding to the input field to complete the commands, displaying, in the recipient field, a drop-down menu listing the recipients in an order based on the likelihoods of the user selecting the recipients for the resource distribution.

In an eighth embodiment alone or in combination with any of the first through seventh embodiments, the process flow 200 may include, when determining the likelihoods of the user selecting the recipients for the resource distribution, providing the single user input to a machine learning model trained using the historical resource distribution data associated with the user to determine the likelihoods of the user selecting the recipients for the resource distribution.

In a ninth embodiment alone or in combination with any of the first through eighth embodiments, the process flow 200 may include, before displaying the graphical user interface and during another interaction with the user, displaying, via the user device and to the user, the graphical user interface including the input fields, receiving, from the user and via the graphical user interface displayed via the user device, the inputs corresponding to each of the input fields, and/or, after receiving the inputs, receiving, from the user and via the graphical user interface displayed via the user device, an input command to associate the inputs with the single user input.

In a tenth embodiment alone or in combination with any of the first through ninth embodiments, the single user input may include an image input to an input field of the graphical user interface.

In an eleventh embodiment alone or in combination with any of the first through tenth embodiments, the input field may be a text field, and the image may include an image, symbol, and/or icon used in electronic communication to express an emotional attitude, convey information succinctly, and/or communicate a message without using words.

In a twelfth embodiment alone or in combination with any of the first through eleventh embodiments, the single user input may include a selection of a link in the graphical user interface.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

Conventional electronic systems require users to input a variety of information, typically using several clicks, such as selecting a recipient, an amount, and/or the like to provide instructions for a digital payment, particularly a reoccurring resource distribution, a common resource distribution, and/or the like. In contrast, some embodiments of systems in accordance with the present invention permit a user to use an emoji (e.g., an image, symbol, or icon used in electronic communication to express an emotional attitude, convey information succinctly, or communicate a message without using words) or a symbol to provide instructions for a digital payment.

In some embodiments, a system may be configured to predictively complete payment instructions of a user based on an emoji and previous behavior of the user. For example, if a user always pays a babysitter $100.00 on the first of the month and the system receives a baby emoji around the first of the month, the system may identify the baby emoji as payment instructions to pay the babysitter $100.00 via the same or similar payment rails the user has historically used.

In some embodiments, a system may be configured to provide predictive payment options based on an emoji selected by the user. For example, the system may identify what emojis the user has used in the past and present predictive payment options based on those historic uses. In some embodiments, the predictive payment option emoji could be a payment to a person, a specific order (e.g., a meal order that the user typically purchases) for a one touch payment, and/or the like. In this way, the emoji creates a one touch payment for a single payment, recurring payment, an order for a product, and/or the like. Additionally, or alternatively, the user may be able to set an emoji for specific people, payments, transactions, and/or the like.

In some embodiments, a system may permit a user to use a single image (e.g., an emoji) as payment instructions. For example, the system may predictively complete payment instructions in response to a user inputting an emoji in an input field of a payment instruction user interface. Additionally, or alternatively, the system may predict the other inputs to the payment instruction based on the user's previous behavior (e.g., using artificial intelligence). As another example, the user may provide input designating the emoji as a trigger to complete payment instructions for a single payment, a recurring payment, an order for a product (e.g., a lunch order), and/or the like. In some embodiments, the system may generate a payment summary based on the transaction history, the user may select the payment summary (e.g., via a link or by inputting an emoji) at the time of entering the payment instructions, and the system may auto-populate the fields of the payment instructions. Additionally, or alternatively, the user may also generate the payment summary themselves and then trigger the payment summary via a link or an emoji.

As noted above, in some embodiments, the process flows described herein may include performing one or more of the functions described herein using artificial intelligence, machine learning, a machine learning model, and/or the like. For example, the system may provide user input to a machine learning model trained (e.g., using data associated with historical resource distributions, data associated with user input for providing commands to perform historical resource distributions, data associated with outcomes historical resource distributions, and/or the like) to output other inputs to other input fields for providing commands to perform resource distributions. As another example, the system may provide user input to a machine learning model trained (e.g., using data associated with historical resource distributions, data associated with user input for providing commands to perform historical resource distributions, data associated with outcomes historical resource distributions, and/or the like) to output likelihoods of a user selecting one or more inputs for an input field to provide a command to perform a resource distribution.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on data associated with historical resource distributions, data associated with user input for providing commands to perform historical resource distributions, data associated with outcomes historical resource distributions, and/or the like over a predetermined past period of time. In doing so, the system may be configured to generate likelihoods, thresholds, input for input fields, suggested input for input fields, and/or the like. In some embodiments, the one or more machine learning algorithms may be used to calculate likelihoods, and whether the likelihoods satisfy a threshold. Additionally, or alternatively, the system may continuously re-train the machine learning model using data associated with user input, data associated with resource distributions, outcomes of resource distributions, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for electronically augmenting resource distribution commands and facilitating transfer of resources, the system comprising:
  at least one non-transitory storage device; and
  at least one processing device coupled to the at least one non-transitory storage device, wherein the at least one processing device is configured to:
    train, using data associated with historical resource distributions, data associated with user input for providing commands to perform the historical resource distributions, and data associated with outcomes of the historical resource distributions over a predetermined past period of time, a machine learning model to receive user inputs and output other inputs to other input fields for providing commands to perform resource distributions;
    display, via a user device and to a user, a graphical user interface comprising input fields for providing commands to perform a resource distribution, wherein the commands comprise an amount of resources to be distributed from a source retainer associated with the user to another source retainer when performing the resource distribution;
    receive, from the user and via the graphical user interface displayed via the user device, a single user input at the graphical user interface, wherein the single user input comprises an image input to an input field of the graphical user interface;
    in response to receiving the single user input, automatically identify, using the machine learning model and by providing the single user input to the machine learning model, inputs corresponding to each of the input fields;
    in response to receiving the single user input, display, via the graphical user interface displayed via the user device and in each input field of the input fields, an input, of the inputs, corresponding to the input field to complete the commands;

receive, from the user and via the graphical user interface displayed via the user device, a confirmation input confirming the completed commands; and in response to receiving the confirmation input, perform the resource distribution by distributing the amount of the resources from the source retainer associated with the user to the other source retainer.

2. The system of claim 1, wherein the at least one processing device is configured to:
before displaying the graphical user interface, prompt, via the user device, the user to provide authentication credentials;
receive, via the user device, the authentication credentials;
determine, using the authentication credentials, whether the user has authority to provide commands to perform resource distributions from the source retainer; and
when displaying the graphical user interface, only display the graphical user interface after determining that the user has the authority to provide commands to perform resource distributions from the source retainer.

3. The system of claim 1, wherein the input field is a text field, and wherein the image comprises at least one of an image, symbol, or icon used in electronic communication to at least one of express an emotional attitude, convey information succinctly, or communicate a message without using words.

4. The system of claim 1, wherein the input fields comprise:
an amount field for the amount of resources to be distributed;
a source retainer field for the source retainer; and
a recipient field for a recipient of the resource distribution.

5. The system of claim 1, wherein:
the input fields comprise an order field for identifying at least one of goods or services; and
the at least one processing device is configured to:
when automatically identifying the inputs corresponding to each of the input fields, automatically identify information identifying at least one of goods or services previously ordered by the user during a historical interaction associated with the single user input; and
when displaying, via the graphical user interface and in each input field of the input fields, the input, of the inputs, corresponding to the input field to complete the commands, display, in the order field, the information identifying the at least one of goods or services previously ordered by the user during the historical interaction associated with the single user input.

6. The system of claim 1, wherein the input fields comprise a recipient field for a recipient of the resource distribution, and wherein the at least one processing device is configured to:
when automatically identifying inputs corresponding to each of the input fields, automatically identify, based on the historical resource distribution data associated with the user, recipients of previous resource distributions associated with the single user input;
determine, based on the historical resource distribution data associated with the user and for each recipient of the recipients, likelihoods of the user selecting the recipients for the resource distribution; and
when displaying, via the graphical user interface and in each input field of the input fields, the input, of the inputs, corresponding to the input field to complete the commands, display, in the recipient field, a drop-down menu listing the recipients in an order based on the likelihoods of the user selecting the recipients for the resource distribution.

7. The system of claim 6, wherein the at least one processing device is configured to, when determining the likelihoods of the user selecting the recipients for the resource distribution, provide the single user input to a machine learning model trained using the historical resource distribution data associated with the user to determine the likelihoods of the user selecting the recipients for the resource distribution.

8. The system of claim 1, wherein the at least one processing device is configured to, before displaying the graphical user interface and during another interaction with the user:
display, via the user device and to the user, the graphical user interface comprising the input fields;
receive, from the user and via the graphical user interface displayed via the user device, the inputs corresponding to each of the input fields; and
after receiving the inputs, receive, from the user and via the graphical user interface displayed via the user device, an input command to associate the inputs with the single user input.

9. The system of claim 8, wherein the input field is a text field, and wherein the image comprises at least one of an image, symbol, or icon used in electronic communication to at least one of express an emotional attitude, convey information succinctly, or communicate a message without using words.

10. The system of claim 8, wherein the single user input comprises a selection of a link in the graphical user interface.

11. A computer program product for electronically augmenting resource distribution commands and facilitating transfer of resources, the computer program product comprising a non-transitory computer-readable medium comprising code causing a first apparatus to:
train, using data associated with historical resource distributions, data associated with user input for providing commands to perform the historical resource distributions, and data associated with outcomes of the historical resource distributions over a predetermined past period of time, a machine learning model to receive user inputs and output other inputs to other input fields for providing commands to perform resource distributions;
display, via a user device and to a user, a graphical user interface comprising input fields for providing commands to perform a resource distribution, wherein the commands comprise an amount of resources to be distributed from a source retainer associated with the user to another source retainer when performing the resource distribution;
receive, from the user and via the graphical user interface displayed via the user device, a single user input at the graphical user interface, wherein the single user input comprises an image input to an input field of the graphical user interface;
in response to receiving the single user input, automatically identify, using the machine learning model and by providing the single user input to the machine learning model, inputs corresponding to each of the input fields;
in response to receiving the single user input, display, via the graphical user interface displayed via the user device and in each input field of the input fields, an input, of the inputs, corresponding to the input field to complete the commands;

receive, from the user and via the graphical user interface displayed via the user device, a confirmation input confirming the completed commands; and in response to receiving the confirmation input, perform the resource distribution by distributing the amount of the resources from the source retainer associated with the user to the other source retainer.

12. The computer program product of claim 11, wherein the non-transitory computer-readable medium comprises code causing the first apparatus to:

before displaying the graphical user interface, prompt, via the user device, the user to provide authentication credentials;

receive, via the user device, the authentication credentials;

determine, using the authentication credentials, whether the user has authority to provide commands to perform resource distributions from the source retainer; and when displaying the graphical user interface, only display the graphical user interface after determining that the user has the authority to provide commands to perform resource distributions from the source retainer.

13. The computer program product of claim 11, wherein the input field is a text field, and wherein the image comprises at least one of an image, symbol, or icon used in electronic communication to at least one of express an emotional attitude, convey information succinctly, or communicate a message without using words.

14. The computer program product of claim 11, wherein the input fields comprise:

an amount field for the amount of resources to be distributed;

a source retainer field for the source retainer; and a recipient field for a recipient of the resource distribution.

15. A method for electronically augmenting resource distribution commands and facilitating transfer of resources, the method comprising:

training, using data associated with historical resource distributions, data associated with user input for providing commands to perform the historical resource distributions, and data associated with outcomes of the historical resource distributions over a predetermined past period of time, a machine learning model to receive user inputs and output other inputs to other input fields for providing commands to perform resource distributions;

displaying, via a user device and to a user, a graphical user interface comprising input fields for providing commands to perform a resource distribution, wherein the commands comprise an amount of resources to be distributed from a source retainer associated with the user to another source retainer when performing the resource distribution;

receiving, from the user and via the graphical user interface displayed via the user device, a single user input at the graphical user interface, wherein the single user input comprises an image input to an input field of the graphical user interface;

in response to receiving the single user input, automatically identifying, using the machine learning model and by providing the single user input to the machine learning model, inputs corresponding to each of the input fields;

in response to receiving the single user input, displaying, via the graphical user interface displayed via the user device and in each input field of the input fields, an input, of the inputs, corresponding to the input field to complete the commands;

receiving, from the user and via the graphical user interface displayed via the user device, a confirmation input confirming the completed commands; and in response to receiving the confirmation input, performing the resource distribution by distributing the amount of the resources from the source retainer associated with the user to the other source retainer.

16. The method of claim 15 comprising:

before displaying the graphical user interface, prompting, via the user device, the user to provide authentication credentials;

receiving, via the user device, the authentication credentials;

determining, using the authentication credentials, whether the user has authority to provide commands to perform resource distributions from the source retainer; and when displaying the graphical user interface, only displaying the graphical user interface after determining that the user has the authority to provide commands to perform resource distributions from the source retainer.

17. The method of claim 15, wherein the input field is a text field, and wherein the image comprises at least one of an image, symbol, or icon used in electronic communication to at least one of express an emotional attitude, convey information succinctly, or communicate a message without using words.

18. The method of claim 15, wherein the input fields comprise:

an amount field for the amount of resources to be distributed;

a source retainer field for the source retainer; and a recipient field for a recipient of the resource distribution.

19. The method of claim 15, wherein the input fields comprise an order field for identifying at least one of goods or services, and wherein the method comprises:

when automatically identifying the inputs corresponding to each of the input fields, automatically identifying information identifying at least one of goods or services previously ordered by the user during a historical interaction associated with the single user input; and when displaying, via the graphical user interface and in each input field of the input fields, the input, of the inputs, corresponding to the input field to complete the commands, displaying, in the order field, the information identifying the at least one of goods or services previously ordered by the user during the historical interaction associated with the single user input.

20. The method of claim 15, wherein the input fields comprise a recipient field for a recipient of the resource distribution, and wherein the method comprises:

when automatically identifying inputs corresponding to each of the input fields, automatically identifying, based on the historical resource distribution data associated with the user, recipients of previous resource distributions associated with the single user input;

determining, based on the historical resource distribution data associated with the user and for each recipient of the recipients, likelihoods of the user selecting the recipients for the resource distribution; and when displaying, via the graphical user interface and in each input field of the input fields, the input, of the inputs, corresponding to the input field to complete the commands, displaying, in the recipient field, a drop-down menu listing the recipients in an order based on the likelihoods of the user selecting the recipients for the resource distribution.

* * * * *